(12) United States Patent
Shum et al.

(10) Patent No.: US 8,665,567 B2
(45) Date of Patent: Mar. 4, 2014

(54) SUSPENSION ASSEMBLY HAVING A MICROACTUATOR GROUNDED TO A FLEXURE

(75) Inventors: Wing C. Shum, San Mateo, CA (US); Yanning Liu, San Ramon, CA (US); John E. Scura, Paso Robles, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 342 days.

(21) Appl. No.: 12/827,813

(22) Filed: Jun. 30, 2010

(65) Prior Publication Data

US 2012/0002329 A1    Jan. 5, 2012

(51) Int. Cl.
*G11B 5/56*    (2006.01)

(52) U.S. Cl.
USPC ........................................ 360/294.3

(58) Field of Classification Search
None
See application file for complete search history.

(56) References Cited

U.S. PATENT DOCUMENTS

| | | | |
|---|---|---|---|
| 5,521,778 A | 5/1996 | Boutaghou et al. | |
| 5,754,368 A | 5/1998 | Shiraishi et al. | |
| 6,278,587 B1 * | 8/2001 | Mei | 360/294.6 |
| 6,307,715 B1 | 10/2001 | Berding et al. | |
| 6,490,228 B2 | 12/2002 | Killam | |
| 6,856,075 B1 | 2/2005 | Houk et al. | |
| 7,064,928 B2 | 6/2006 | Fu et al. | |
| 7,177,119 B1 | 2/2007 | Bennin et al. | |
| 7,218,481 B1 | 5/2007 | Bennin et al. | |
| 7,322,241 B2 | 1/2008 | Kai | |
| 7,382,582 B1 | 6/2008 | Cuevas | |
| 7,417,830 B1 | 8/2008 | Kulangara | |
| 7,459,835 B1 | 12/2008 | Mei et al. | |
| 7,509,859 B2 | 3/2009 | Kai | |
| 7,832,082 B1 | 11/2010 | Hentges et al. | |
| 7,929,252 B1 | 4/2011 | Hentges et al. | |
| 8,149,542 B2 | 4/2012 | Ando | |
| 8,339,748 B2 | 12/2012 | Shum et al. | |
| 8,542,465 B2 | 9/2013 | Liu et al. | |
| 2002/0075606 A1 * | 6/2002 | Nishida et al. | 360/294.4 |
| 2002/0118492 A1 * | 8/2002 | Watanabe et al. | 360/294.4 |
| 2009/0190263 A1 | 7/2009 | Miura et al. | |
| 2009/0294740 A1 | 12/2009 | Kurtz et al. | |
| 2010/0177445 A1 | 7/2010 | Fuchino | |
| 2010/0271735 A1 * | 10/2010 | Schreiber | 360/290 |

OTHER PUBLICATIONS

U.S. Provisional Patent U.S. Appl. No. 61/396,239, filed May 24, 2010, (16 pages).
U.S. Non-Provisional Patent U.S. Appl. No. 13/114,212, filed May 24, 2011, (23 pages).

* cited by examiner

*Primary Examiner* — David D Davis

(57) ABSTRACT

Disclosed is a suspension assembly for a disk drive that includes: a mounting plate having a through-hole extending from a top-side of the mounting plate to a bottom-side of the mounting plate; a microactuator mounting structure formed in the mounting plate; a microactuator mounted in the microactuator mounting structure; and a flexure attached to the bottom-side of the of mounting plate. The flexure includes: a metal layer; an insulator layer; a trace layer that includes a ground trace; and an opening, wherein the opening extends through the metal layer and the insulator layer to a gold-plated ground trace. A conductive epoxy is bonded to the microactuator and extends through the through-hole to bond to the flexure, wherein the epoxy extends through the opening of the flexure to the gold-plated ground trace of the flexure such that the microactuator is grounded to the flexure.

24 Claims, 4 Drawing Sheets

SUSPENSION ASSEMBLY HAVING A MICROACTUATOR GROUNDED TO A FLEXURE

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g. writing, flying height control, touch down detection, lapping control, etc).

In a modern magnetic hard disk drive device, each read head is a sub-component of a head gimbal assembly (HGA). The read head typically includes a slider and a read/write transducer. The read/write transducer typically comprises a magneto-resistive read element (e.g. so-called giant magneto-resistive read element, or a tunneling magneto-resistive read element) and an inductive write structure comprising a flat coil deposited by photolithography and a yoke structure having pole tips that face a disk media.

The HGA typically also includes a suspension assembly that includes a mounting plate, a load beam, and a laminated flexure to carry the electrical signals to and from the read head. The read head is typically bonded to a tongue feature of the laminated flexure. The HGA, in turn, is a sub-component of a head stack assembly (HSA) that typically includes a plurality of HGAs, a rotary actuator, and a flex cable. The mounting plate of each suspension assembly is attached to an arm of the rotary actuator (e.g. by swaging), and each of the laminated flexures includes a flexure tail that is electrically connected to the HSA's flex cable (e.g. by solder bonding).

Modern laminated flexures typically include electrically conductive copper traces that are isolated from a stainless steel support layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that are electrically connected to a plurality of electrically conductive bonding pads on the head, and extend from adjacent the head to terminate at electrical connection points at the flexure tail.

The position of the HSA relative to the spinning disks in a disk drive, and therefore the position of the read heads relative to data tracks on the disks, is actively controlled by the rotary actuator which is typically driven by a voice coil motor (VCM). Specifically, electrical current passed through a coil of the VCM applies a torque to the rotary actuator, so that the read head can seek and follow desired data tracks on the spinning disk.

However, the industry trend towards increasing areal data density has necessitated substantial reduction in the spacing between data tracks on the disk. Also, disk drive performance requirements, especially requirements pertaining to the time required to access desired data, have not allowed the rotational speed of the disk to be reduced. In fact, for many disk drive applications, the rotational speed has been significantly increased. A consequence of these trends is that increased bandwidth is required for servo control of the read head position relative to data tracks on the spinning disk.

One solution that has been proposed in the art to increase disk drive servo bandwidth is dual-stage actuation. Under the dual-stage actuation concept, the rotary actuator that is driven by the VCM is employed as a coarse actuator (for large adjustments in the HSA position relative to the disk), while a so-called "microactuator" having higher bandwidth but lesser stroke is used as a fine actuator (for smaller adjustments in the read head position). Various microactuator designs have been proposed in the art for the purpose of dual-stage actuation in disk drive applications. Some of these designs utilize one or more piezoelectric microactuators that are affixed to a stainless steel component of the suspension assembly (e.g. the mounting plate or an extension thereof, and/or the load beam or an extension thereof, and/or an intermediate stainless steel part connecting the mounting plate to the load beam).

However, if the microactuator is electrically connected to a stainless steel surface of the suspension assembly (e.g. for grounding), an electrochemical reaction may cause an oxidation layer to form on the stainless steel at the connection location. The oxidation layer may be insulative and interfere with desired electrical conduction, and may be exacerbated by hot and humid conditions. Over time, the desired response of the microactuator to applied signals may become diminished, leading to reduced or impaired performance of the information storage device and/or data loss.

Therefore, there is a need in the information storage device arts for a suspension assembly design that can improve integration with a microactuator by improving the grounding of the microactuator.

DETAILED DESCRIPTION

Figure 1:
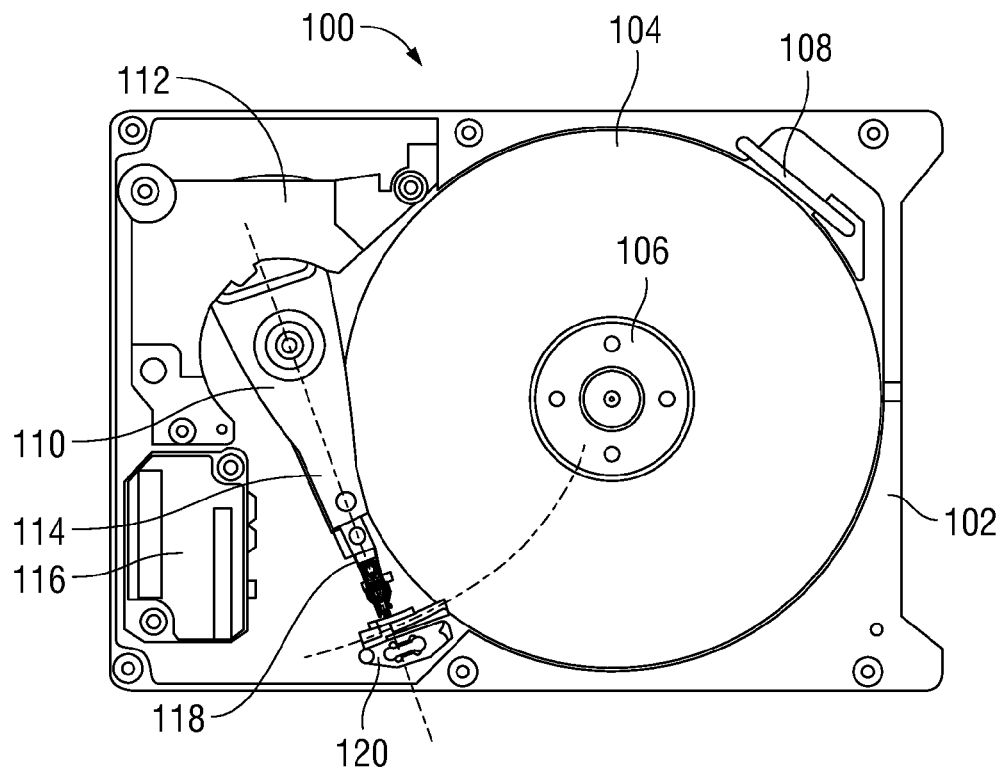
FIG. 1 is top view of a disk drive that is capable of including an embodiment of the invention.

FIG. 1 is top view of a disk drive 100 that is capable of including an embodiment of the present invention. The disk drive 100 includes a disk drive base 102. The disk drive 100 further includes a spindle 106, rotably mounted on the disk drive base 102, for rotating a disk 104 that is mounted on the spindle 106. The rotation of the disks 104 establishes air flow through optional recirculation filter 108. In certain embodiments, disk drive 100 may have only a single disk 104, or alternatively, two or more disks.

The disk drive 100 further includes a rotary coarse actuator 110 that is rotably mounted on disk drive base 102. The rotary coarse actuator 110 includes an actuator arm 114 that supports a head gimbal assembly (HGA) 118. Voice coil motor 112 rotates the actuator 110 through a limited angular range so that the HGA 118 may be desirably positioned relative to one or more tracks of information on the disk 104. Preferably the disk drive 100 will include one HGA 118 per disk surface, but depopulated disk drives are also contemplated in which fewer HGAs are used. Under non-operating conditions the HGAs may be parked on ramp 120, for example to avoid contact with the disk 104 when it is not spinning. Electrical signals to/from the HGA 118 are carried to other drive electronics, in part via a flex cable (not shown) and a flex cable bracket 116.

Figure 2:
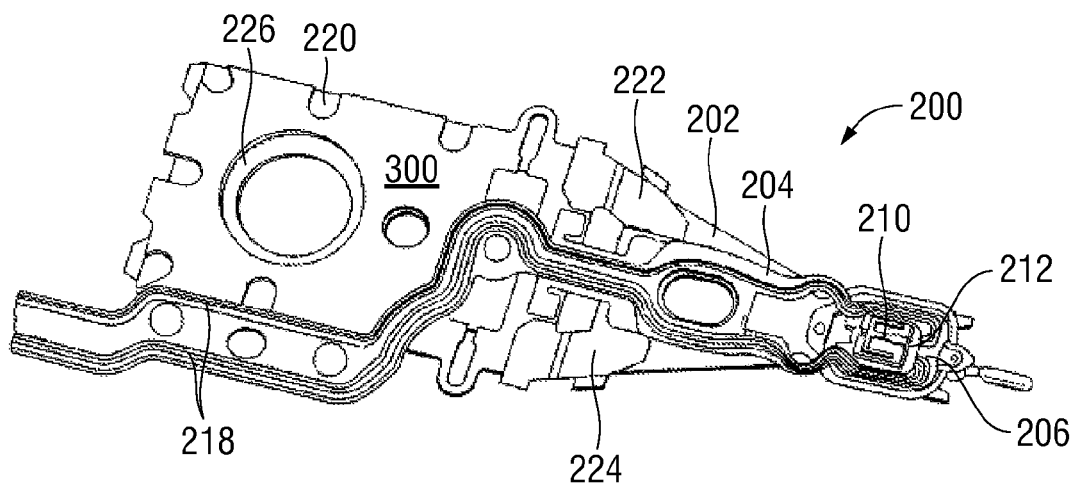
FIG. 2 is a bottom perspective view of the head gimbal assembly (HGA).

FIG. 2 is a bottom perspective view of an HGA 200. Referring additionally to FIG. 2, the HGA 200 includes a load beam 202, and a read head 210 for reading and writing data from and to a magnetic disk (e.g. disk 104). The read head 210 includes a slider substrate having an air bearing surface (the label 210 points to this surface) and an opposing top surface (not visible in the view of FIG. 2). The slider substrate preferably comprises AlTiC, although another ceramic or silicon might also be used. The slider substrate of the read head 210 also includes a trailing face 212 that includes a read/write transducer (too small to be practically shown in the view of FIG. 2, but disposed on the trailing face 212). In certain embodiments, the read/write transducer is preferably an inductive magnetic write transducer merged with a magneto-resistive read transducer. The purpose of the load beam 202 is to provide limited vertical compliance for the read head 210 to follow vertical undulations of the surface of a disk (e.g. disk 104 of FIG. 1) as it rotates, and to preload the air bearing surface of the read head 210 against the disk surface by a preload force that is commonly referred to as the "gram load."

In the embodiment of FIG. 2, the HGA 200 also includes a laminated flexure 204 attached to the load beam 202. The laminated flexure 204 includes a tongue 206 that has a read head bonding surface. The head 210 is attached to the read head bonding surface of the tongue 206 of the laminated flexure 204. Only a portion of the tongue 206 is visible in the view of FIG. 2 because the read head 210 partially obscures it. A first purpose of the laminated flexure 204 is to provide compliance for the head 210 to follow pitch and roll angular undulations of the surface of the disk (e.g. disk 104) as it rotates, while restricting relative motion between the read head 210 and the load beam 202 in the lateral direction and about a yaw axis. A second purpose of the laminated flexure 204 is to provide a plurality of electrical paths to facilitate signal transmission to/from the read head 210. For that second purpose, the laminated flexure 204 includes a plurality of electrically conductive traces 218 that are defined in an electrically conductive (e.g. copper) sub-layer of the laminated flexure 204. Electrically conductive traces 218 are isolated from a support layer (e.g. stainless steel) by a dielectric layer (e.g. polyimide).

In the embodiment of FIG. 2, the load beam 202 includes hinge plates 222 and 224, and is attached to a mounting plate 220 via the hinge plates 222 and 224 and a microactuator mounting structure 300. These components may be made of stainless steel, and their attachments to each other may be made by a plurality of spot welds, for example. Alternatively, the load beam 202 may have integral hinge plate regions rather than being assembled with separate hinge plate components, so that the load beam 202 and its hinge plates would be a single component having material continuity. In another alternative, the microactuator mounting structure 300 can also be an integral part of the mounting plate 220.

The load beam 202 with its hinge plates 222, 224 (if any), the microactuator mounting structure 300, and the mounting plate 220, may together be referred to as a "suspension assembly." Accordingly, the mounting plate 220 may also be referred to as a suspension assembly mounting plate 220. In certain preferred embodiments, the suspension assembly mounting plate 220 includes a swage boss 226 to facilitate attachment of the suspension assembly to an actuator arm (e.g. actuator arm 114). In that case, the suspension assembly mounting plate 220 may also be referred to as a "swage mounting plate." Note that, after the laminated flexure 204 is attached to the load beam 202, the laminated flexure 204 may be considered to also pertain to the "suspension assembly."

Figure 3:
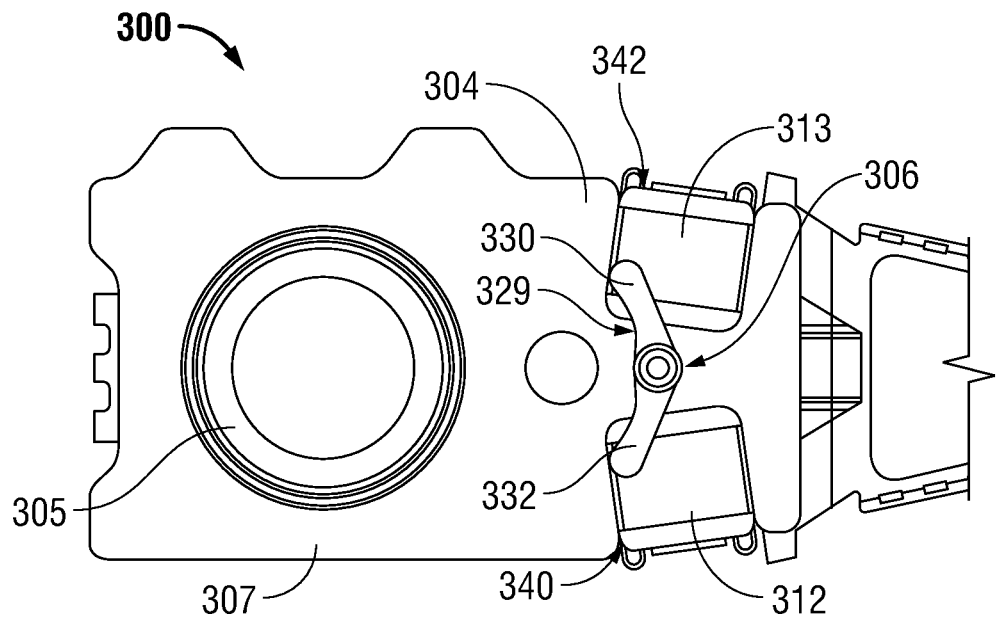
FIG. 3 is a top view of a portion of the HGA, according to one embodiment of the invention.

FIG. 3 is a top view of a portion of the HGA, according to one embodiment of the invention. The suspension assembly 300 of the HGA includes a mounting plate 304. The mounting plate 304 may include a swage tower 305 to facilitate attachment of the mounting plate suspension assembly to an actuator arm (e.g. actuator arm 114). The mounting plate 304 may have a through-hole 306 extending from a top-side 307 of the mounting plate 304 to a bottom-side of the mounting plate. As will be described, in one embodiment, a microactuator mounting structure (340, 342) is formed in the mounting plate 304 and a microactuator (312, 313) may be mounted in the microactuator mounting structure 304. An epoxy 329 may be mounted to a microactuator and may extend through the through-hole 306 to bond to a flexure, in which, the epoxy 329 extends through an opening of the flexure to a ground trace of the flexure such that the microactuator is grounded to the flexure.

In particular, mounting plate 304 may include a pair of approximately square-shaped microactuator mounting structures 340 and 342 that are formed in the mounting plate 304. Microactuators 312 and 313 may each be mounted in a microactuator mounting structure 340 and 342, respectively. As is known in the art, microactuators are typically used to position a read head. Further, epoxy lines 330 and 332 of epoxy 329 may each be bonded to a microactuator and may extend through the through-hole 306 to bond to a flexure, in which, the epoxy 329 extends through an opening of the flexure to a gold-plated ground trace of the flexure such that the microactuator is grounded to the flexure. It should be appreciated to those of skill in the art that a single microactuator may be mounted to the mounting plate, a pair of microactuators may be mounted to the mounting plate, or any suitable number of microactuators may be mounted to the mounting plate.

Figure 4:
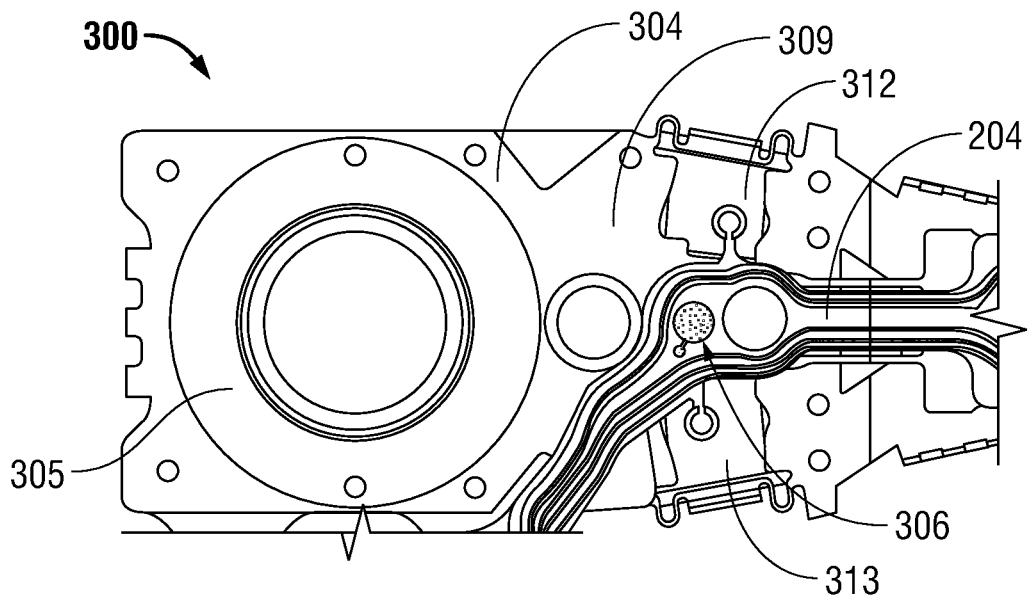
FIG. 4 is a bottom view of a portion of the HGA, according to one embodiment of the invention.

With reference also to FIG. 4, which is a bottom view of a portion of the HGA, according to one embodiment of the invention, the through-hole 306 extends from the top-side 307 of the mounting plate 304 to the bottom-side 309 of the mounting plate 304. Further, as can be seen on the bottom-side 309 of the mounting plate 304, flexure 204 is attached to the bottom-side 309 of the mounting plate 304 and flexure 204 is coupled to the microactuators 312 and 313. As will be described in more detail hereinafter, the flexure 204 may include a metal layer, an insulator layer, a trace layer which includes a ground trace, and an opening, wherein the opening extends through the metal layer and the insulator layer to a gold-plated ground trace of the flexure.

Thus, in one embodiment, a pair of epoxy lines 330 and 332 of epoxy 329 may be bonded to the microactuators 312 and 313 and may extend through the through-hole 306 to bond to the flexure 204. In particular, as will be described in more detail hereinafter, the epoxy 329 may extend through an opening of the flexure to the ground trace of the flexure such that the microactuator 312 and 313 are grounded to the flexure 204.

In one embodiment, the microactuators 312 and 313 are piezoelectric (PZT) microactuators. The piezoelectric microactuators 312 and 313 may be gold (Au) plated. Further, in one embodiment, the epoxy 329 may include silver (Ag) and is conductive. However, it should be appreciated that any sort of suitable epoxy or solder that is conductive may be utilized.

Figure 5:
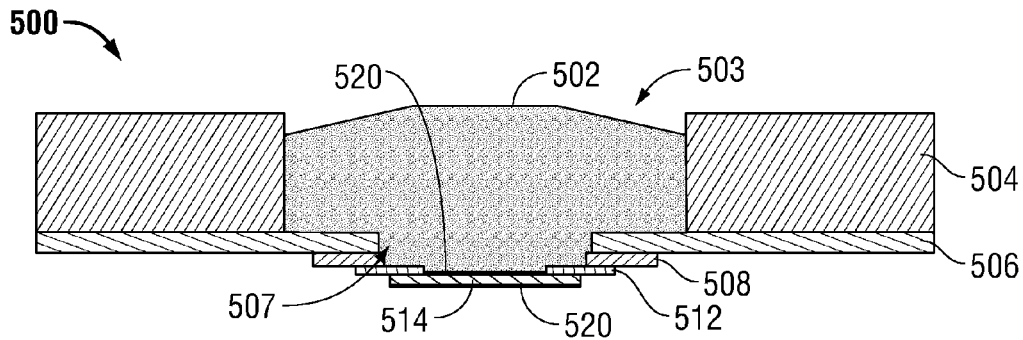
FIG. 5 is a cross-sectional view illustrating the epoxy extending through the mounting plate and through the holes of the flexure to ground to the flexure, according to one embodiment of the invention.

With reference now to FIG. 5, FIG. 5 illustrates a cross-sectional view 500 of the epoxy extending through the mounting plate through the holes of the flexure to ground to the flexure, according to one embodiment of the invention. In particular, looking at FIG. 5, epoxy 502 extends through the through-hole 503 of mounting plate 504 and through load beam 506 to extend through an opening 507 of the flexure, and particularly, extends through the steel layer 508 and the insulator layer 512 of the flexure to bond to the gold-plated 520 copper layer 514 of the flexure, which is the ground trace. In this way, microactuators 312 and 313 through epoxy 502 are grounded to the gold-plated ground trace of the copper layer 514 of the flexure.

Figure 6:
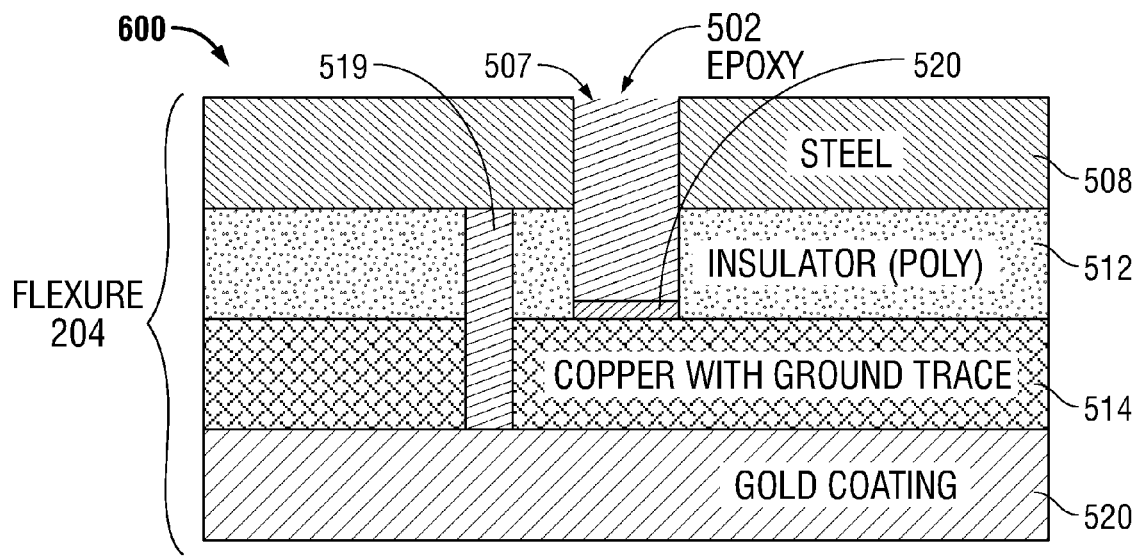
FIG. 6 is a cross-sectional view illustrating the epoxy extending through the flexure to ground to the flexure, according to one embodiment of the invention.

With reference also to FIG. 6, FIG. 6 illustrates a cross-sectional view 600 of the epoxy 502 extending through the flexure 204 to ground to the flexure 204, according to one embodiment of the invention. As previously described, in one embodiment, the metal layer 508 of the flexure 204 may be stainless steel and the insulator layer 512 may be a polyimide. Further, as shown in FIG. 6, flexure 204 may include a gold-plated 520 copper layer 514 that includes a ground trace. As previously described, copper layer 514 of flexure 204 may include a plurality of conductive traces and a ground trace. Further, the ground trace of the copper layer 514 may be grounded by a via 519 to the steel layer 508. Also, has been previously described, with reference to the functions of the flexure 204, the read head is typically electrically connected to one or more of the pluralities of conductive traces of the copper layer 514.

Thus, in one embodiment, an Ag epoxy 502 may be used to ground the microactuators by extending from the microactuators through a through-hole of the mounting plate 504 and through an opening 507 of the flexure 204 to extend through the steel layer 508 and the insulator layer 512 of the flexure 204 to ground to the ground trace of the exposed gold-plated 520 copper layer 514 of the flexure. Accordingly, there is a direct grounding of the microactuators to the ground trace of the flexure by simply extending an epoxy through a through-hole of the mounting plate. This is advantageous in that it solves problems associated with microactuators that are currently being bonded to the steel of the mounting plate and does so utilizing the current flexure cable with virtually no additional cost or design/process changes.

Figure 7:
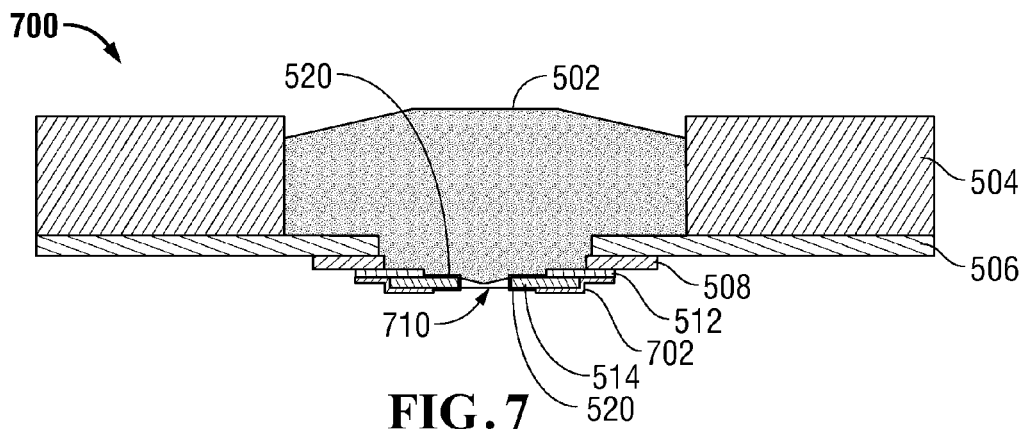
FIG. 7 is a cross-sectional view illustrating the epoxy extending through the mounting plate and to the flexure and particularly illustrates an air gap, according to one embodiment of the invention.

Additional embodiments are hereinafter described to let air out so that epoxy can flow down more easily to more easily contact the gold-plated copper layer. FIG. 7 is a cross-sectional view 700 illustrating the epoxy 502 extending through the mounting plate 504 and into the flexure and particularly illustrates an air gap, according to another embodiment of the invention. In this embodiment, the epoxy 502 extends through the mounting plate 504, the load beam 506, the steel layer 508, and the insulator layer 512 to the gold-plated 520 copper layer 514. However, this embodiment includes an air hole or gap 710 formed in the gold-plated 520 copper layer 514 to allow for air flow. In one embodiment, a cover 702 that may be formed from a thin insulator material is present. By having the air hole, air is let out so that the epoxy 502 can flow down more easily to more easily contact the gold-plated 520 copper layer 514. Without the air hole, air bubbles may form preventing the epoxy from more completely covering and contacting the gold-plated copper layer.

Figure 8:
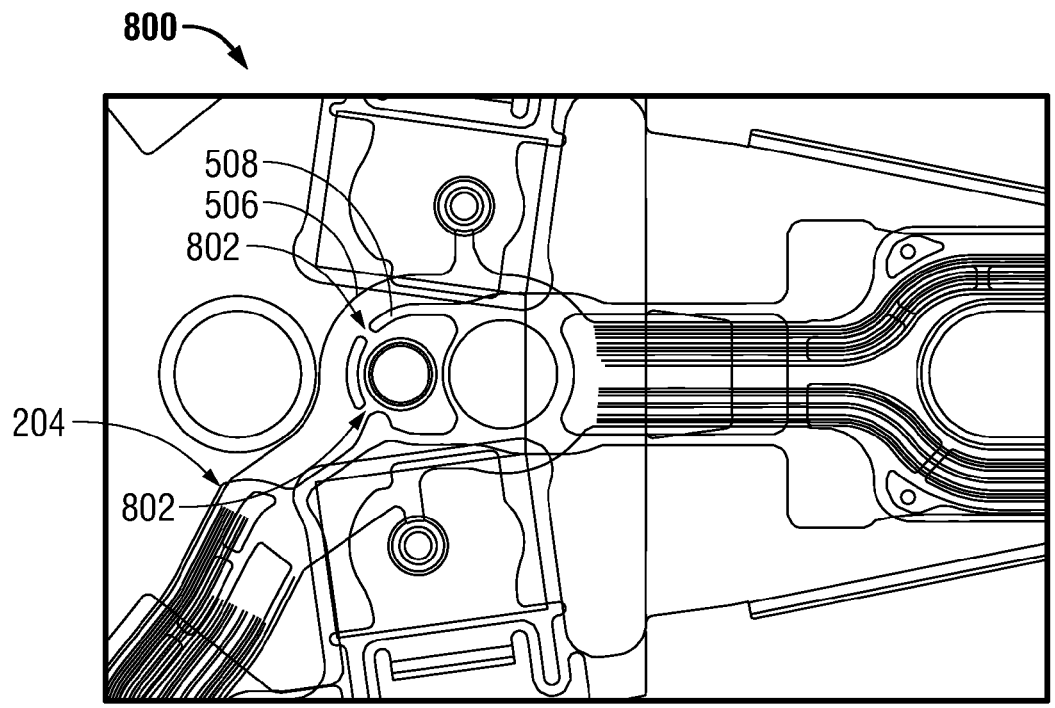
FIG. 8 is a schematic diagram of the flexure metal layer including an air gap, according to one embodiment of the invention.
Figure 9:
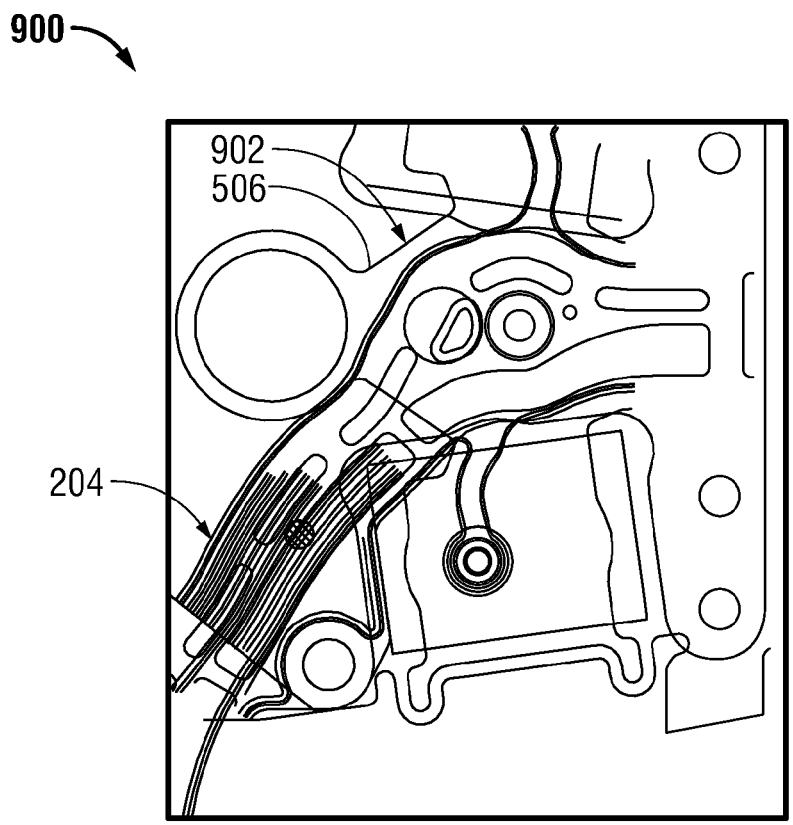
FIG. 9 is a schematic diagram of the bottom-side of the load beam including an air gap, according to one embodiment of the invention.

Turning to FIG. 8, a schematic diagram of the flexure metal layer 800 is shown. In particular, FIG. 8 illustrates that gaps 802 may be formed in the metal layer 508 of the flexure 204 adjacent the metal load beam layer 506 to allow for air flow. With reference to FIG. 9, a schematic diagram of the bottom-side of the load beam 900 is illustrated. As can be seen in FIG. 9, the metal load beam layer 506 may include a gap 902 to let air flow out. These additional embodiments aid in letting air flow out so that the epoxy can flow down more easily to more easily contact the gold-plated copper layer, as previously described.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A disk drive comprising:
   a spindle attached to a disk drive base;
   a disk mounted on the spindle;
   a coarse actuator attached to the disk drive base, the coarse actuator including an actuator arm; and
   a suspension assembly attached to the actuator arm, the suspension assembly including:
   a mounting plate having a through-hole extending from a top-side of the mounting plate to a bottom-side of the mounting plate;
   a microactuator mounting structure formed in the mounting plate;
   a microactuator mounted in the microactuator mounting structure, the microactuator to position a read head;
   a flexure attached to the bottom-side of the of mounting plate, the flexure including a metal layer, an insulator layer, a trace layer which includes a ground trace, and an opening, wherein the opening extends through the metal layer and the insulator layer to a gold-plated ground trace; and
   a conductive epoxy bonded to the microactuator extending through the through-hole to bond to the flexure, wherein the epoxy extends through the opening of the flexure to the gold-plated ground trace of the flexure such that the microactuator is grounded to the flexure.

2. The disk drive of claim 1 further comprising a plurality of microactuators, each microactuator mounted in a respective microactuator mounting structure of the mounting plate, the epoxy being bonded to each of the microactuators and extending through the through-hole to bond to the flexure.

3. The disk drive of claim 1 wherein the microactuator is a piezoelectric microactuator.

4. The disk drive of claim 3 wherein the piezoelectric microactuator is gold (Au) plated.

5. The disk drive of claim 1 wherein the epoxy includes silver (Ag).

6. The disk drive of claim 1 wherein the metal layer of the flexure is stainless steel and the insulator layer is a polyimide.

7. The disk drive of claim 1 wherein the flexure further comprises a copper layer that includes the ground trace and a plurality of conductive traces, wherein the ground trace is grounded to the metal layer.

8. The disk drive of claim 7 wherein the copper layer is gold (Au) plated such that the epoxy extends from a gold plating of the microactuator to the gold plated copper layer.

9. The disk drive of claim 7 wherein the read head is electrically connected to one or more of the plurality of conductive traces.

10. The disk drive of claim 7 further comprising an air-hole formed through the copper layer to allow for air flow.

11. The disk drive of claim 1 wherein the metal layer of the flexure includes a gap to allow for air flow.

12. The disk drive of claim 1 wherein a load beam of the mounting plate includes a gap to allow for air flow.

13. A suspension assembly comprising:
a mounting plate having a through-hole extending from a top-side of the mounting plate to a bottom-side of the mounting plate;
a microactuator mounting structure formed in the mounting plate;
a microactuator mounted in the microactuator mounting structure, the microactuator to position a read head;
a flexure attached to the bottom-side of the of mounting plate, the flexure including a metal layer, an insulator layer, a trace layer which includes a ground trace, and an opening, wherein the opening extends through the metal layer and the insulator layer to a gold-plated ground trace; and
a conductive epoxy bonded to the microactuator extending through the through-hole to bond to the flexure, wherein the epoxy extends through the opening of the flexure to the gold-plated ground trace of the flexure such that the microactuator is grounded to the flexure.

14. The suspension assembly of claim 13 further comprising a plurality of microactuators, each microactuator mounted in a respective microactuator mounting structure of the mounting plate, the epoxy being bonded to each of the microactuators and extending through the through-hole to bond to the flexure.

15. The suspension assembly of claim 13 wherein the microactuator is a piezoelectric microactuator.

16. The suspension assembly of claim 15 wherein the piezoelectric microactuator is gold (Au) plated.

17. The suspension assembly of claim 13 wherein the epoxy is silver (Ag).

18. The suspension assembly of claim 13 wherein the metal layer of the flexure is stainless steel and the insulator layer is a polyimide.

19. The suspension assembly of claim 13 wherein the flexure further comprises a copper layer that includes the ground trace and a plurality of conductive traces, wherein the ground trace is grounded to the metal layer.

20. The suspension assembly of claim 19 wherein the copper layer is gold (Au) plated such that the epoxy extends from a gold plating of the microactuator to the gold plated copper layer.

21. The suspension assembly of claim 19 wherein the read head is electrically connected to one or more of the plurality of conductive traces.

22. The suspension assembly of claim 19 further comprising an air-hole formed through the copper layer to allow for air flow.

23. The suspension assembly of claim 13 wherein the metal layer of the flexure includes a gap to allow for air flow.

24. The suspension assembly of claim 13 wherein a load beam of the mounting plate includes a gap to allow for air flow.

* * * * *